US010252668B2

(12) United States Patent
Johnson (10) Patent No.: US 10,252,668 B2
(45) Date of Patent: Apr. 9, 2019

(54) SYSTEMS, DEVICES, AND/OR METHODS FOR MANAGING MAT APPEARANCE (71) Applicant: Tristan Johnson, Lincolnton, GA (US)

(72) Inventor: Tristan Johnson, Lincolnton, GA (US)

(*) Notice: Subject to any disclaimer, the term of this patent is extended or adjusted under 35 U.S.C. 154(b) by 0 days.

(21) Appl. No.: 15/608,873

(22) Filed: May 30, 2017

(65) Prior Publication Data

US 2018/0194278 A1 Jul. 12, 2018

Related U.S. Application Data (60) Provisional application No. 62/444,214, filed on Jan. 9, 2017.

(51) Int. Cl.
B60N 3/04 (2006.01)
B60Q 3/14 (2017.01)
B60Q 3/16 (2017.01)
B60Q 3/74 (2017.01)
B60Q 3/80 (2017.01)

(52) U.S. Cl.
CPC .............. B60Q 3/745 (2017.02); B60N 3/048 (2013.01); B60Q 3/14 (2017.02); B60Q 3/16 (2017.02); B60Q 3/80 (2017.02)

(58) Field of Classification Search
CPC .......... B60Q 3/745; B60Q 3/88; B60Q 3/046; B60Q 3/048; B60Q 3/04
See application file for complete search history.

(56) References Cited

U.S. PATENT DOCUMENTS 9,851,935 B1 * 12/2017 Cohen .................. G06F 3/1423

* cited by examiner

Primary Examiner — Mary Ellen Bowman
(74) Attorney, Agent, or Firm — Dale Jensen, PLC; Dale Jensen (57) ABSTRACT Certain exemplary embodiments can provide a system, which can comprise a pad. The pad comprises an array of light emitting diodes, wherein each light emitting diode of the array of light emitting diodes can be capable of being illuminated in a plurality of colors responsive to a signal from an information device. The information device is constructed to illuminate a predetermined set of the array of light emitting diodes to generate a pattern, which pattern can comprise alphanumeric characters.

17 Claims, 8 Drawing Sheets

SYSTEMS, DEVICES, AND/OR METHODS FOR MANAGING MAT APPEARANCE

CROSS-REFERENCES TO RELATED APPLICATIONS

This application claims priority to, and incorporates by reference herein in its entirety, U.S. Provisional Patent Application Ser. No. 62/444,214, filed Jan. 9, 2017.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments can provide a system, which can comprise a pad. The pad comprises an array of light emitting diodes, wherein each light emitting diode of the array of light emitting diodes can be capable of being illuminated in a plurality of colors responsive to a signal from an information device. The information device is constructed to illuminate a predetermined set of the array of light emitting diodes to generate a pattern, which pattern can comprise alphanumeric characters.

Certain exemplary embodiments can provide illuminated floor mats, which are embedded with an array of thousands of multi-colored LED lights. Certain exemplary embodiments can provide 2 modes, which provide an option to program an interchangeable display or pattern sequence of your choice. These mats can be controlled by your smartphone or the microprocessor that comes with preset designs such as popular automotive makers brand logos. Users can cause a rendering of most anything they desire. Certain exemplary embodiments can allow you to adjust the brightness of the lights by remote or on your phone.

Certain exemplary embodiments can provide two modes, light sequence pattern and picture display. Certain exemplary embodiments can render popular brand logos. Certain exemplary embodiments can display user photos.

Certain exemplary embodiments can withstand even the roughest use by users. The LED matrix can be embedded in a durable rubber base sheet covered with a hard, substantially waterproof layer of epoxy resin or a sheet of substantially clear, substantially waterproof silicone to provide durability and damage resistance.

Figure 1:
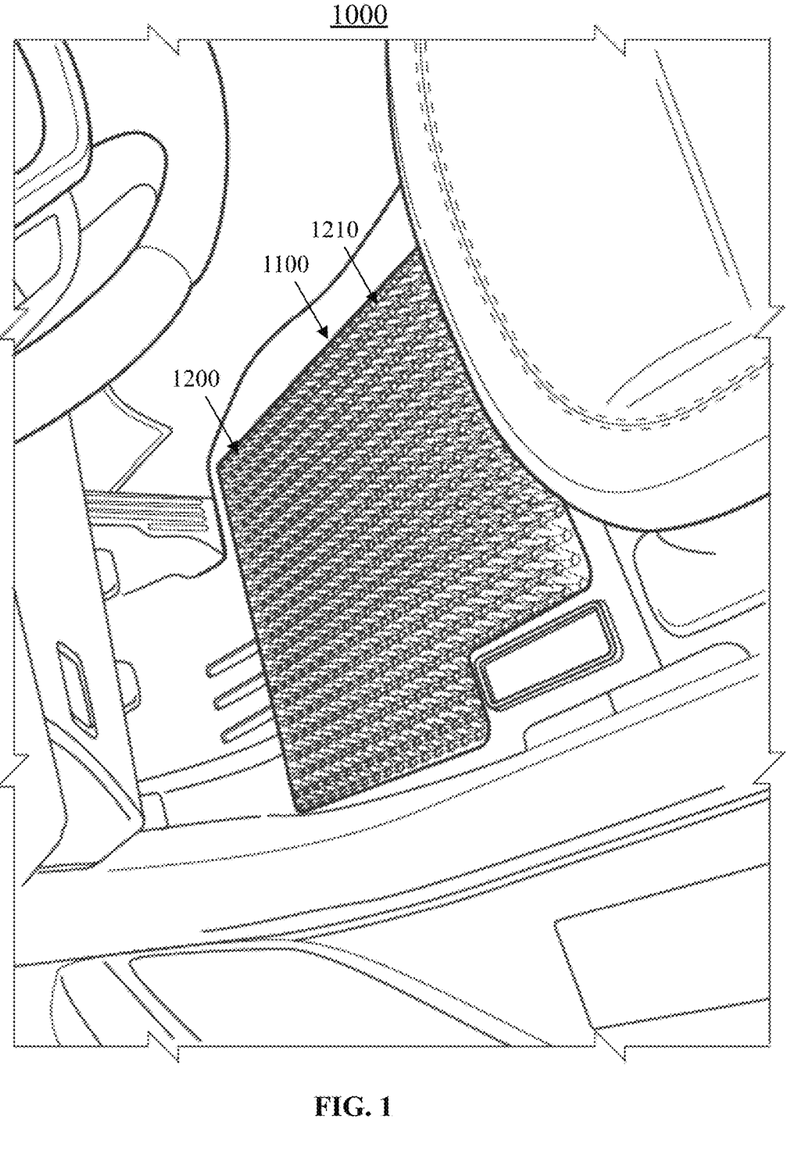
FIG. 1 is a perspective view of an exemplary embodiment of a system 1000.

FIG. 1 is a perspective view of an exemplary embodiment of a system, which illustrates an LED mat comprising an array of light emitting diodes ("LEDs") that is installed in a vehicle. Each of the array of LEDs is a multicolor LED that is capable of being illuminating illuminated in a color of a plurality of different colors. The array of LEDs is coupled to an information device that is capable of sending a signal to each LED of the array of LEDs causing each LED to illuminate in a selected color of the plurality of different colors. The information device is capable of causing the array of LEDs to illuminate to create a pattern. The pattern can comprise letters and/or words. The pattern can comprise artistic LED shapes, such as those illustrated in FIG. 1. In certain exemplary embodiments, the pattern can change with time responsive to, for example, a musical signal selected by an operator of the vehicle.

System 1000 comprises a pad 1100, which comprises an array of LEDs 1200. Each LED 1210 of array of LEDs 1200 can be capable of being illuminated in a plurality of colors responsive to a signal from an information device (see, e.g., information device 3000 of FIG. 3). Information device 3000 can be constructed to illuminate a predetermined set (see set 1900 of FIG. 1A) of array of LEDs 1200 to create a pattern (see pattern 1950 of FIG. 1A) that comprises alphanumeric characters (see, e.g., alphanumeric characters 4500 of FIG. 4). Pad 1100 can be constructed to support a weight of a human. Pad 1100 can be constructed to be walked on by the human substantially without damage to LEDs 1200. In certain exemplary embodiments, system 1000 can comprise and/or communicatively coupled to the information device (see, e.g., information device 3000 of FIG. 3).

In certain exemplary embodiments, the pattern (see pattern 1950 of FIG. 1A) changes in time with a musical signal. In certain exemplary embodiments, the pattern (see pattern 1950 of FIG. 1A) is an artistic shape. In certain exemplary embodiments, the pattern (see pattern 1950 of FIG. 1A) is repeatedly automatically changed by the information device over time.

In certain exemplary embodiments, pad 1100 is a vehicle floor mat. In certain exemplary embodiments, pad 1100 is a household door mat. A layer of pad 1100 can cover LEDs 1200. LEDs 1200 can be substantially surrounded by portions of pad 1100. In certain exemplary embodiments, LEDs 1200 can be nondestructively replaceable.

In certain exemplary embodiments, the information device (see, e.g., information device 3000 of FIG. 3) is a Raspberry Pi© device. In certain exemplary embodiments, the information device (see, e.g., information device 3000 of FIG. 3) is an Adafruit© device.

Figure 1A:
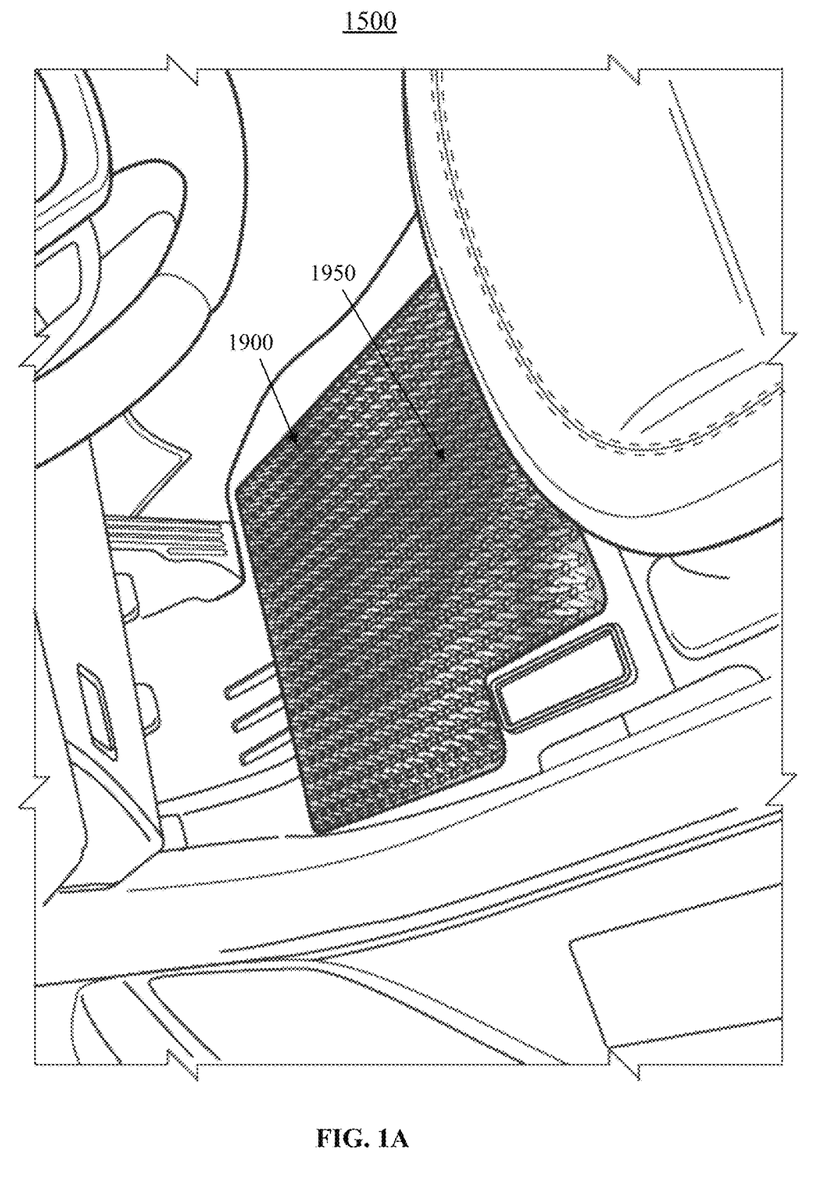
FIG. 1A is a perspective view of an exemplary embodiment of a system 1500.

FIG. 1A is a perspective view of an exemplary embodiment of a system 1500, which illustrates the LED mat comprising the array of light emitting diodes illuminated in an artistic pattern via the information device.

Figure 2:
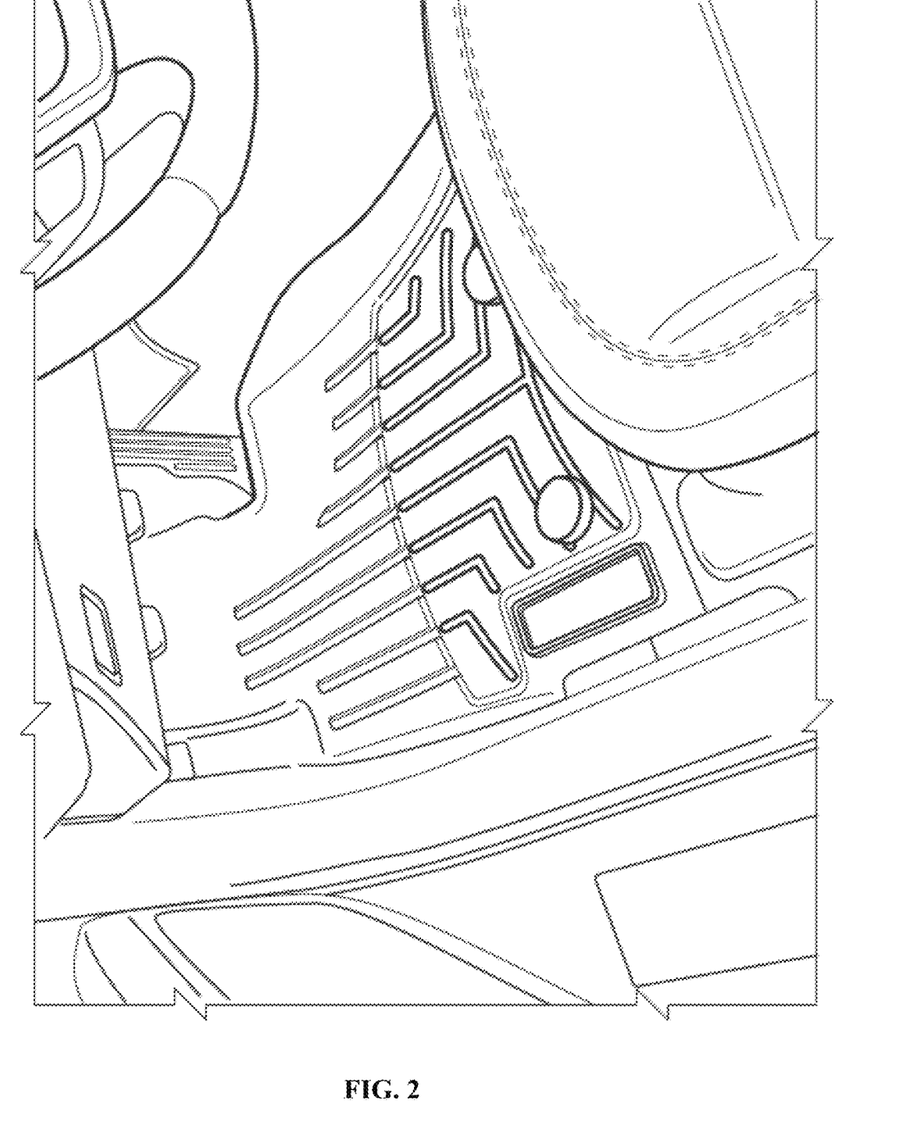
FIG. 2 is a perspective view of an exemplary embodiment of a system.

FIG. 2 is a perspective view of an exemplary embodiment of a system, which illustrates an exemplary floor mat installed in the vehicle prior to installation of LED mat comprising the array of LEDs. The illustrated floor mat is a WeatherTech mat ("WeatherTech" is a registered trademark of MacNeil IP LLC, 1 MacNeil Court Bolingbrook Ill. 60440). Any floor mat can be used as a base for the LED mat comprising the array of LEDs.

Figure 3:
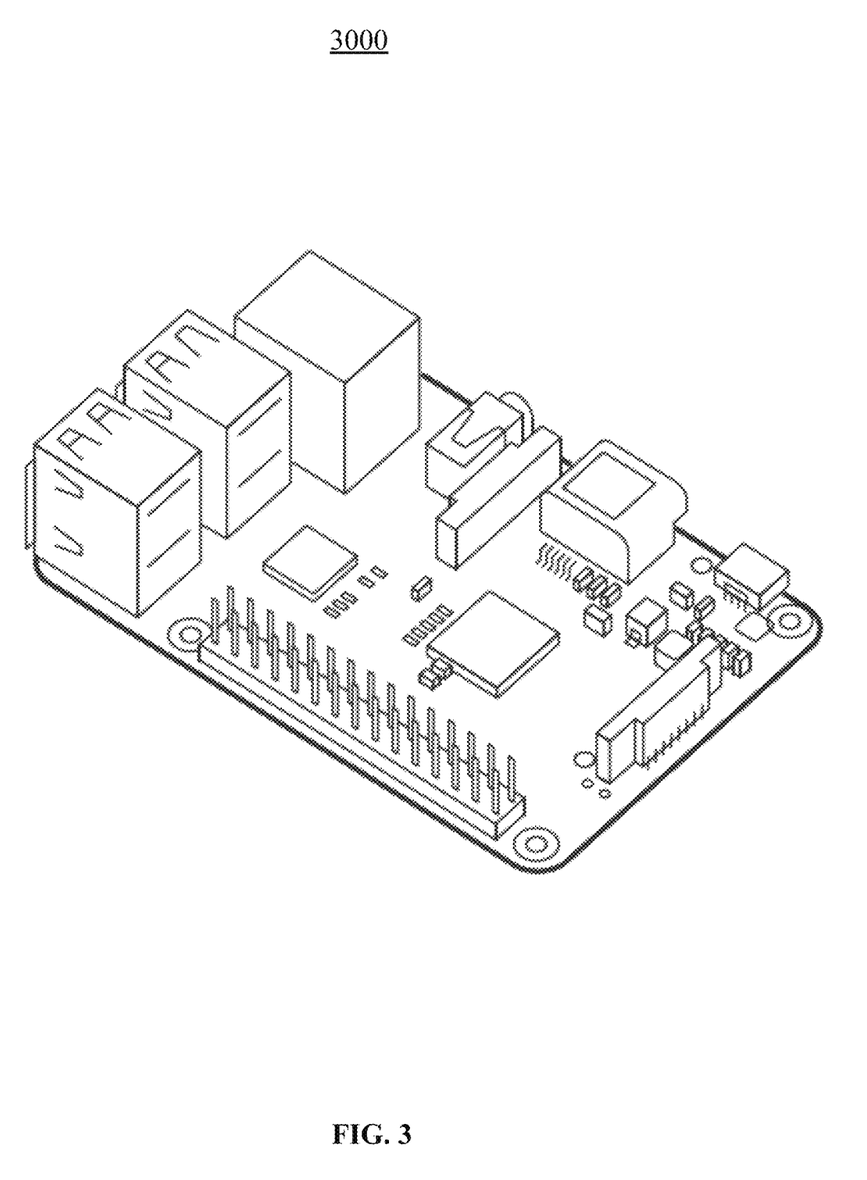
FIG. 3 is a perspective view of an exemplary embodiment of an information device 3000.

FIG. 3 is a perspective view of an exemplary embodiment of an information device 3000, which can be used to control the array of LEDs. In certain exemplary embodiments, the information device can be a Raspberry Pi© device (Raspberry pi is a registered trademark of the Raspberry Pi Foundation, Mitchell Wood House Main Street, Caldecote Cambridge, Cambs United Kingdom CB237NU). In certain exemplary embodiments, the information device can be an Adafruit© device (Adafruit is a registered trademark of Limor Fried of 150 Varick Street 3rd Floor New York N.Y. 10013). The information device can be Bluetooth compatible.

In certain exemplary embodiments, a smartphone, e.g., an iPhone ("iPhone" is a registered trademark of Apple Inc., 1 Infinite Loop Cupertino Calif. 95014) application can send signals to the information device with instructions of how to control the array of LEDs.

Figure 4:
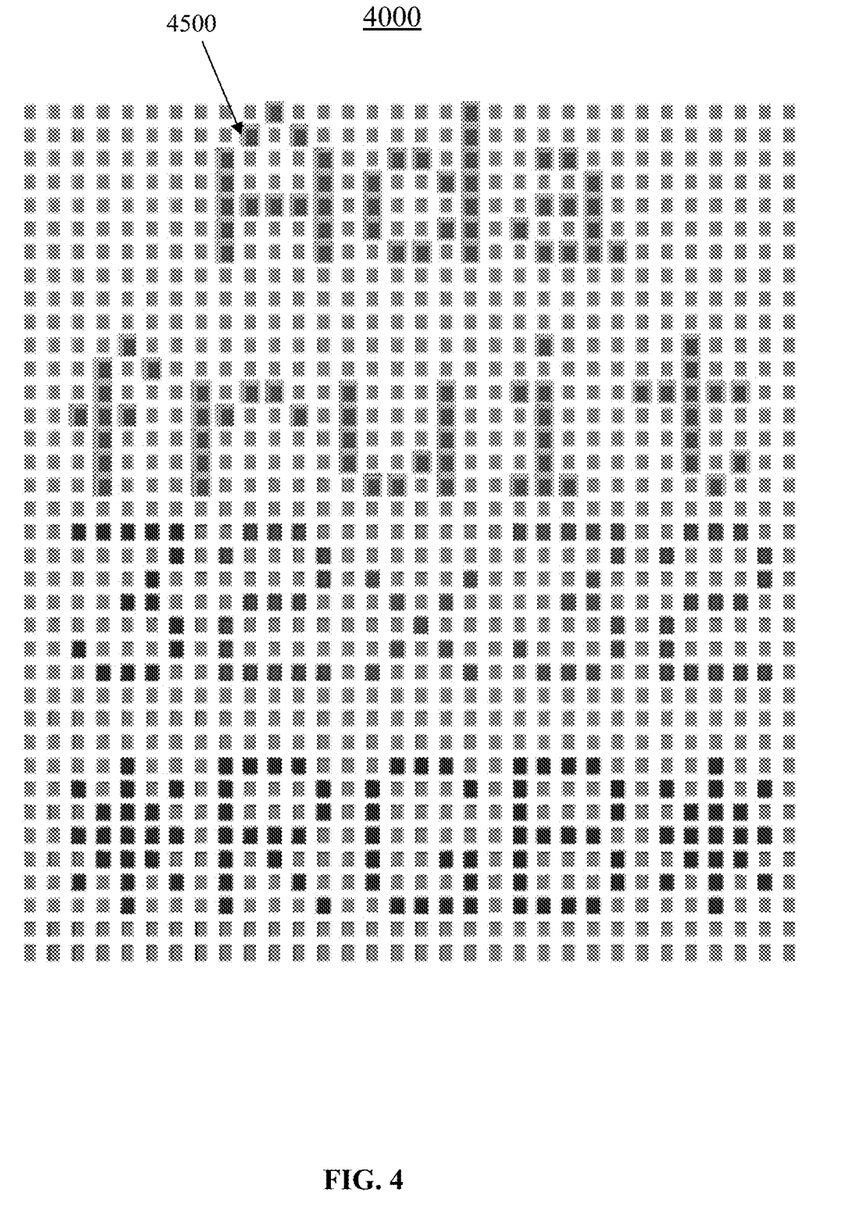
FIG. 4 is a perspective view of an exemplary embodiment of a light emitting diode pad.
Figure 5:
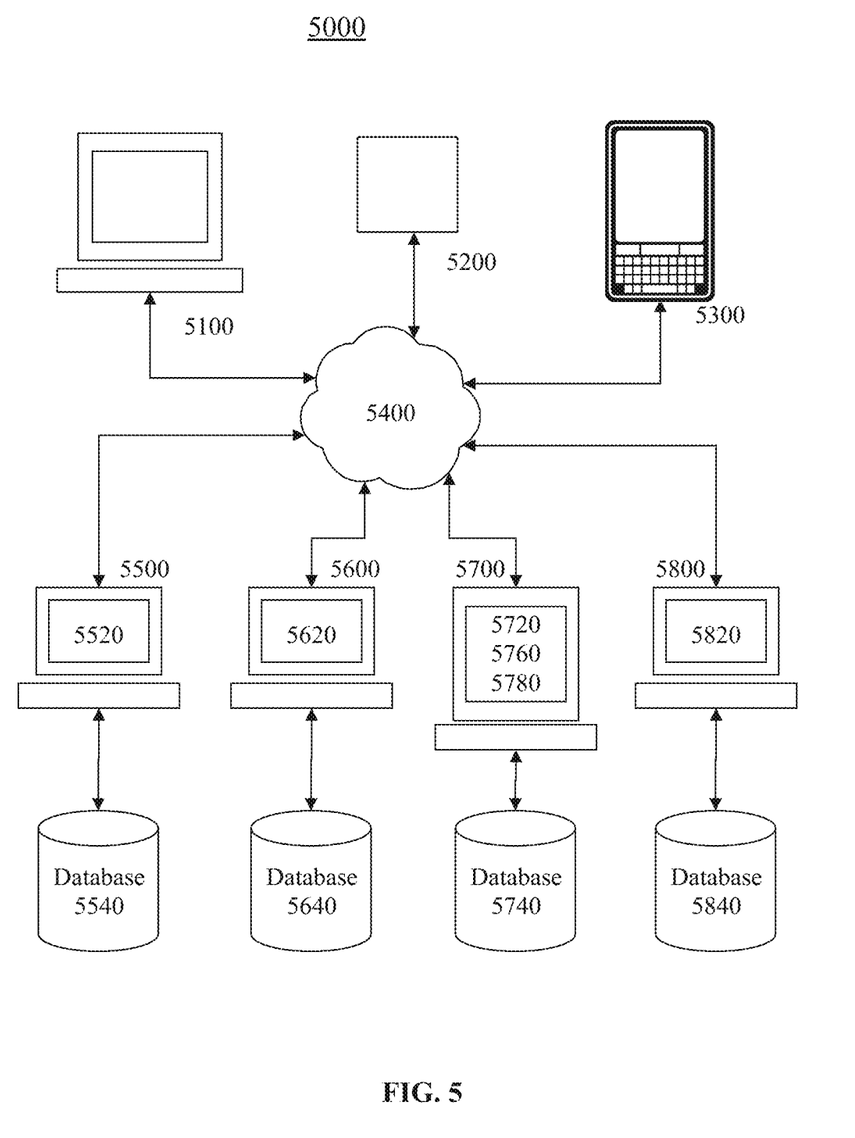
FIG. 5 is a block diagram of an exemplary embodiment of a system 5000.

FIG. 4 is a perspective view of an exemplary embodiment of a light emitting diode pad that has an array of LEDs such as those used in the LED mat. As shown in FIG. 4, letters and words can be displayed on the "LED mat as controlled by the information device FIG. 5 is a block diagram of an exemplary embodiment of a system 5000, which can comprise a smartphone 5300, an information device 5100, a network 5400, a first server 5500, a second server 5600, a third server 5700, and a fourth server 5800. First server 5500 can comprise a first user interface 5520 and can be coupled to a first database 5540. Second server 5600 can comprise a second user interface 5620 and can be coupled to a second database 5640. Third server 5700 can comprise a third user interface 5720, a processor 5760, machine instructions 5780, and can be coupled to a third database 5740. Fourth server 5800 can comprise a fourth user interface 5820 and can be coupled to a fourth database 5840. Any of the methods and/or steps thereof can be carried out in whole or in part by smartphone 5300, information device 5100 and/or first server 5500. Second server 5600, third server 5700, and/or fourth server 5800 can each be associated with controlling an array of LEDs such as on a floor mat. In certain exemplary embodiments, system 5000 can be used to implement one or more methods disclosed herein.

Figure 6:
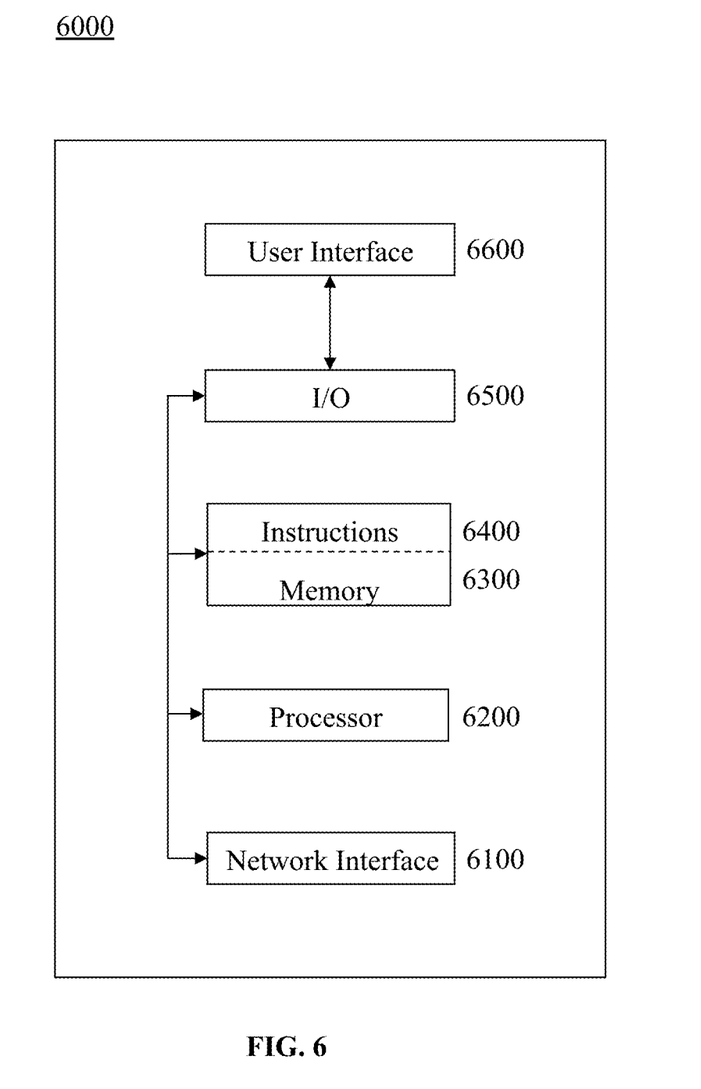
FIG. 6 is a block diagram of an exemplary embodiment of an information device 6000.

FIG. 6 is a block diagram of an exemplary embodiment of an information device 6000, which in certain operative embodiments can comprise, for example, information device 5100, smartphone 5300, first server 5500, second server 5600, third server 5700, and/or fourth server 5800 of FIG. 5. Information device 6000 can comprise any of numerous circuits and/or components, such as for example, one or more network interfaces 6100, one or more processors 6200, one or more memories 6300 containing instructions 6400, one or more input/output (I/O) devices 6500, and/or one or more user interfaces 6600 coupled to one or more input/output (I/O) devices 6500, etc.

In certain exemplary embodiments, via one or more user interfaces 6600, such as a graphical user interface, a user can view a rendering of information related to controlling an array of LEDs.

Figure 7:
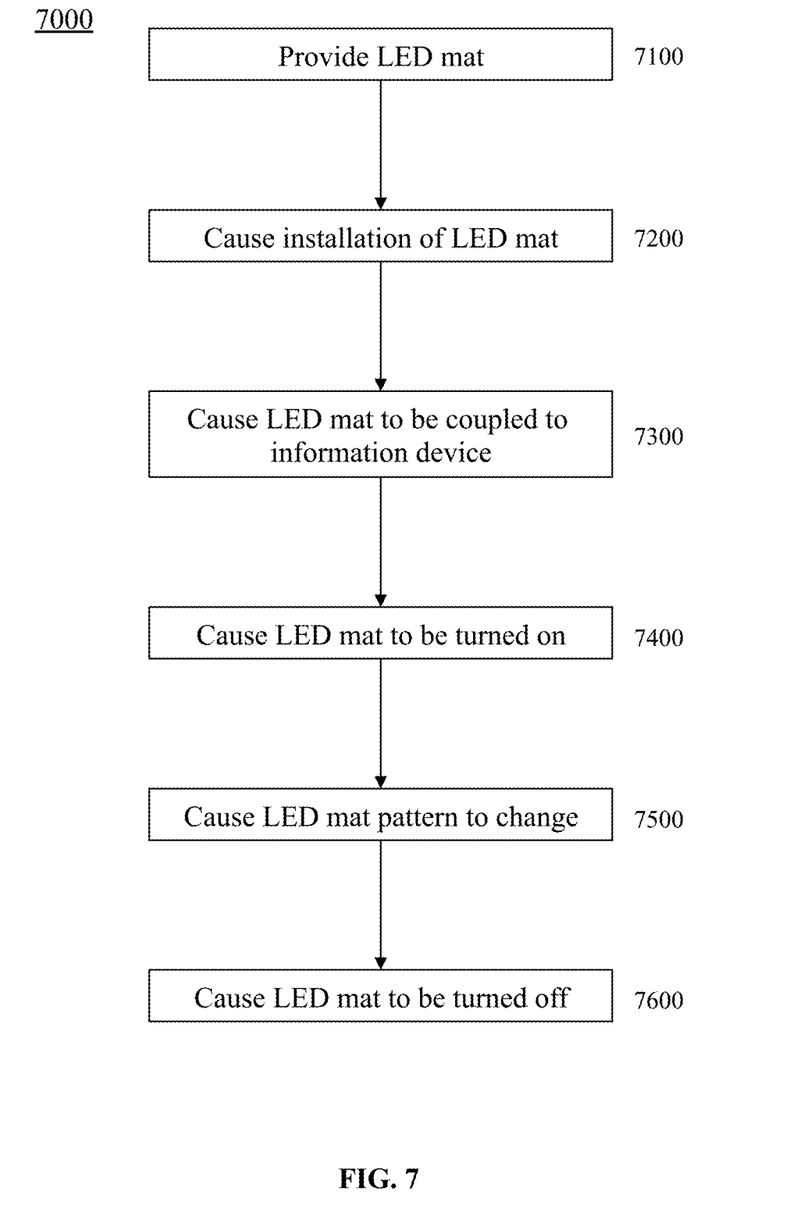
FIG. 7 is a flowchart of an exemplary embodiment of a method 7000.

FIG. 7 is a flowchart of an exemplary embodiment of a method 7000. At activity 7100, an LED mat can be provided. The pad comprises an array of light emitting diodes. Each diode of the array of light emitting diodes can be capable of being illuminated in a plurality of colors responsive to a signal from an information device. The information device is constructed to illuminate a predetermined set of the array of light emitting diodes, which can create a pattern that comprises alphabetic characters. The pad can be constructed to support a weight of a human. The pad can be constructed to be walked on by the human substantially without damage to the array of light emitting diodes.

At activity 7200, certain exemplary embodiments can cause installation of the LED mat. At activity 7300, certain exemplary embodiments can cause the LED mat to be coupled to an information device that controls illumination of an array of LEDs comprised by the LED mat. At activity 7400, certain exemplary embodiments can cause the information device to turn the LED mat on thereby causing the pattern to be rendered on the pad. At activity 7500, certain exemplary embodiments can cause the information device to change the LED mat pattern. At activity 7600, certain exemplary embodiments can cause the information device to turn off the LED mat.

DEFINITIONS

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.
activity—an action, act, step, and/or process or portion thereof
adapted to—made suitable or fit for a specific use or situation.
adapter—a device used to effect operative compatibility between different parts of one or more pieces of an apparatus or system.
alphanumeric characters—of a set of symbols, the set of symbols comprising letters and numbers.
and/or—either in conjunction with or in alternative to.
apparatus—an appliance or device for a particular purpose.
array—a systematic arrangement of similar objects (e.g., light emitting diodes), usually in rows and columns.
artistic—involving aesthetic considerations.
associate—to join, connect together, and/or relate.
automatically—acting or operating in a manner essentially independent of external influence or control. For example, an automatic light switch can turn on upon "seeing" a person in its view, without the person manually operating the light switch.
can—is capable of, in at least some embodiments.
capable—having an ability to be used.
cause—to bring about.
change—to make different.
circuit—an electrically conductive pathway and/or a communications connection established across two or more switching devices comprised by a network and between corresponding end systems connected to, but not comprised by the network.
color—a characteristic of human visual perception described through color categories, with names such as red, yellow, purple, or blue.
comprising—including but not limited to.
configure—to make suitable or fit for a specific use or situation.
connect—to join or fasten together.
convert—to transform, adapt, and/or change.
coupleable—capable of being joined, connected, and/or linked together.
coupling—linking in some fashion.
cover—to be placed over a surface of something.

damage—harm impairing a function or condition of something.

define—to establish the outline, form, or structure of determine—to obtain, calculate, decide, deduce, and/or ascertain.

device—a machine, manufacture, and/or collection thereof.

door mat—a piece of material that can be placed on a floor in an entryway to a building to partially cover the floor and have human feet placed thereon.

estimate—to calculate and/or determine approximately and/or tentatively.

generate—to create, produce, give rise to, and/or bring into existence.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

human—a member of the species *Homo sapiens*.

illuminate—to cause to emit light.

information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

install—to connect or set in position and prepare for use.

light emitting diode—a two-lead semiconductor light source, which is a p-n junction diode that emits light when activated.

machine instructions—directions adapted to cause a machine, such as an information device, to perform one or more particular activities, operations, or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine readable medium—a physical structure from which a machine can obtain data and/or information. Examples include a memory, punch cards, etc.

may—is allowed and/or permitted to, in at least some embodiments.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

music—an arrangement of sounds in time that express ideas and emotions in significant forms through the elements of rhythm, melody, harmony, and/or color.

network—a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

network interface—any device, system, or subsystem capable of coupling an information device to a network. For example, a network interface can be a telephone, cellular phone, cellular modem, telephone data modem, fax modem, wireless transceiver, Ethernet card, cable modem, digital subscriber line interface, bridge, hub, router, or other similar device.

nondestructively—of, relating to, or being a process that does not result in damage to the subject material and/or product.

packet—a discrete instance of communication.

pad—a piece of material constructed to be placed on a surface and at least partially cover the surface; the piece of material constructed to be substantially impervious to damage from human foot traffic.

pattern—a decorative design of something.

plurality—the state of being plural and/or more than one.

portions—parts of predetermined—established in advance.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

project—to calculate, estimate, or predict.

provide—to furnish, supply, give, and/or make available.

receive—to get as a signal, take, acquire, and/or obtain.

recommend—to suggest, praise, commend, and/or endorse.

render—to make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

repeatedly—again and again; repetitively.

replaceable—capable of being substituted for something else in a substantially non-destructive manner.

request—to express a desire for and/or ask for.

set—a related plurality.

signal—information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

store—to place, hold, and/or retain data, typically in a memory.

substantially—to a great extent or degree.

support—to bear the weight of, especially from below.

surround—to enclose on at least four sides.

system—a collection of mechanisms, devices, machines, articles of manufacture, processes, data, and/or instructions, the collection designed to perform one or more specific functions.

time—a rhythm of music.

transmit—to send as a signal, provide, furnish, and/or supply.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

vehicle—a conveyance moving on wheels, runners, tracks, or the like, as a cart, sled, automobile, truck, pickup truck, jeep, sport utility vehicle, or tractor, etc.

floor mat—a piece of material that can be placed on a surface to partially cover the surface and have human feet placed thereon.

via—by way of and/or utilizing.

walk—to move one's feet.

weight—the force with which a body is attracted toward Earth, equal to the product of the object's mass and the acceleration of gravity.

without—substantially lacking.

NOTE

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A system comprising:
a pad, the pad comprising an array of light emitting diodes, each light emitting diode of the array of light emitting diodes capable of being illuminated in a plurality of colors responsive to a signal from an information device, the information device constructed to illuminate a predetermined set of the array of light emitting diodes to generate a pattern that comprises alphanumeric characters, the pad constructed to support a weight of a human, the pad constructed to be walked on by the human substantially without damage to the array of light emitting diodes, the information device constructed to provide two modes, a light sequence pattern mode and picture display mode, wherein the picture display mode allows for display of user photos.

2. The system of claim 1, wherein:
the pattern changes in time with music.

3. The system of claim 1, wherein:
the pattern is an artistic pattern.

4. The system of claim 1, wherein:
the pattern is repeatedly automatically changed by the information device.

5. The system of claim 1, wherein:
the pad is a vehicle floor mat.

6. The system of claim 1, wherein:
the pad is a door mat.

7. The system of claim 1, wherein:
a layer of the pad covers the light emitting diodes.

8. The system of claim 1, wherein:
the light emitting diodes are substantially surrounded by portions of the pad.

9. The system of claim 1, wherein:
the light emitting diodes are nondestructively replaceable.

10. The system of claim 1, wherein:
the image is a photo from a smartphone of a user.

11. The system of claim 1, wherein:
the image is a light sequence pattern.

12. The system of claim 1, further comprising:
the information device.

13. A method comprising:
providing a pad, the pad comprising an array of light emitting diodes, each light emitting diode of the array of light emitting diodes capable of being illuminated in a plurality of colors responsive to a signal from an information device, the information device constructed to illuminate a predetermined set of the array of light emitting diodes to create a pattern that comprises alphabetic characters, the pad constructed to support a weight of a human, the pad constructed to be walked on by the human substantially without damage to the array of light emitting diodes, the information device constructed to provide two modes, a light sequence pattern mode and picture display mode, wherein the picture display mode allows for display of user photos.

14. The method of claim 13, further comprising: causing the pattern to be rendered on the pad.

15. The method of claim 13, further comprising: causing the pattern to be changed on the pad.

16. The system of claim 1, wherein:
the array of light emitting diodes is embedded in a rubber base sheet covered with a substantially clear sheet.

17. The method of claim 13, wherein:
the array of light emitting diodes is embedded in a rubber base sheet covered with a substantially clear sheet.

* * * * *